July 21, 1959                F. ALWARD                2,895,308
MOTOR VEHICLE REFRIGERATION SYSTEM
Filed March 30, 1956                       2 Sheets-Sheet 1
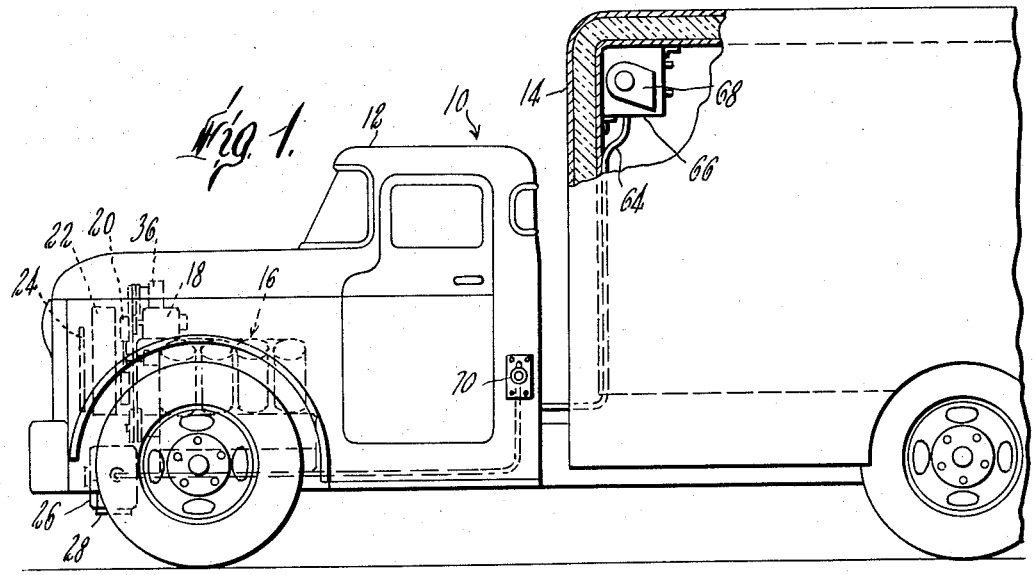
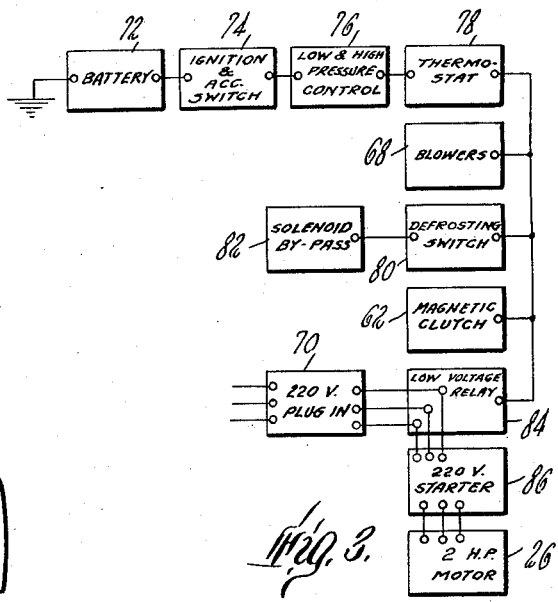
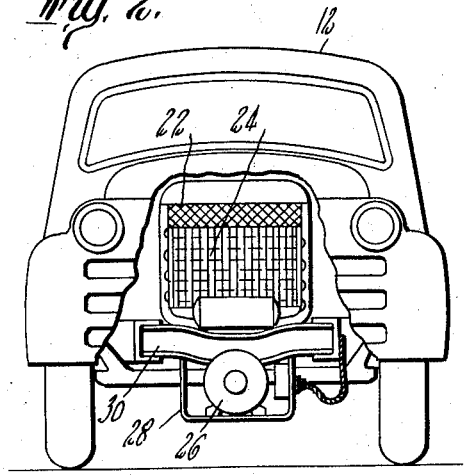
Inventor
Francis Alward

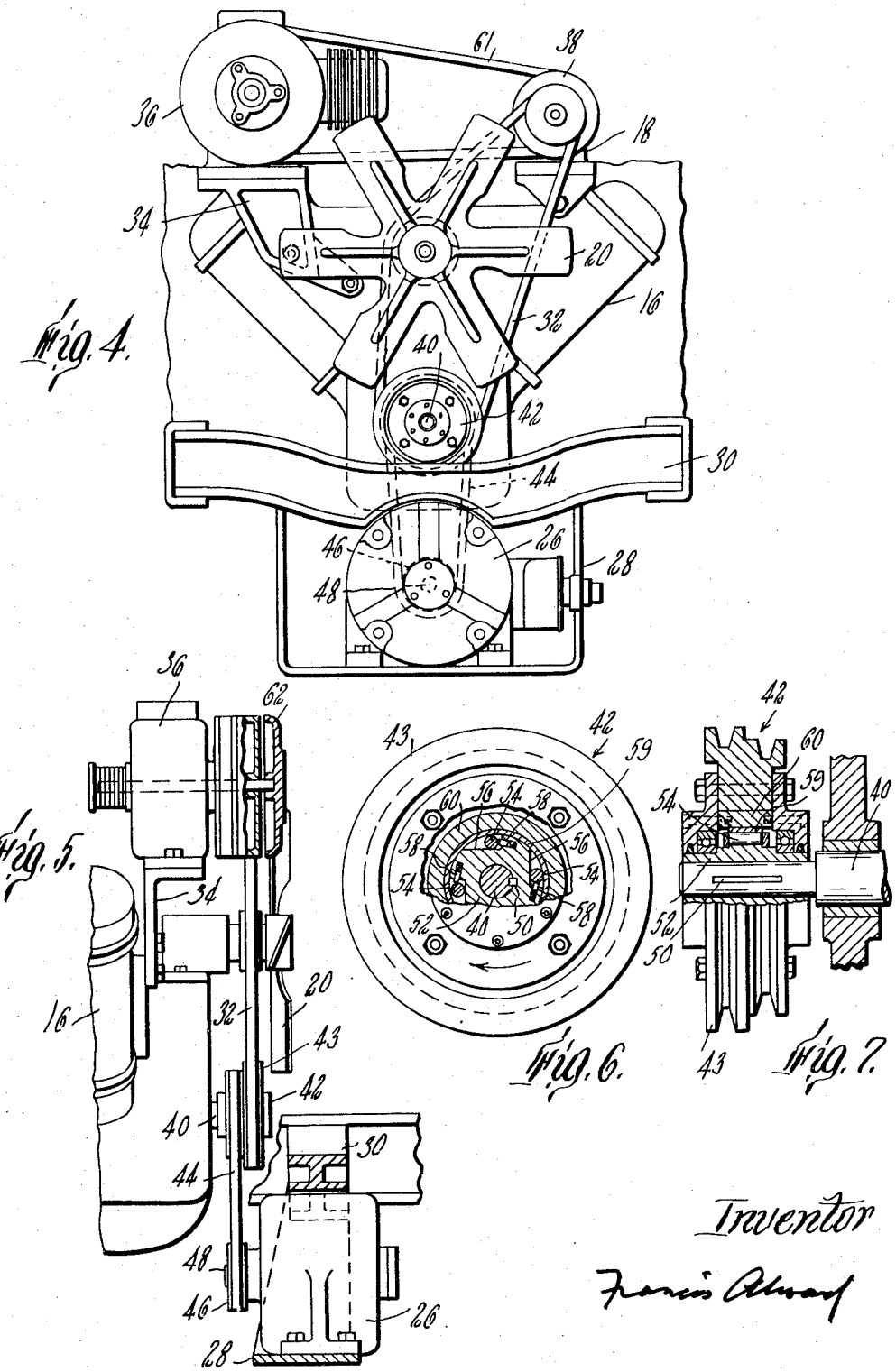

2,895,308

MOTOR VEHICLE REFRIGERATION SYSTEM

Francis Alward, Cambridge, Mass.; Robert F. McNeil, administrator of said Francis Alward, deceased Application March 30, 1956, Serial No. 575,244

5 Claims. (Cl. 62—161)

This invention relates to vehicle refrigeration systems and is more particularly concerned with a new and improved system for refrigerating the cargo space in a motor truck or similar vehicle using either power from the vehicle engine or a source of electric current at the plant or warehouse when the vehicle is parked.

In the protection of perishables such as milk, there is a need for refrigeration of the product, not only while the vehicle is engaged in the process of transporting and delivering it but also when the vehicle is at rest at the plant or elsewhere.

Preferred practice in the dairy industry today is to load the product (for example, milk) directly into the refrigerated body of a truck from the end of the bottling line rather than to store the same in a refrigerated hold-over room, thus saving not only duplicate handling but capital expenditures for large storage facilities.

In order to accomplish this, various means are currently employed to refrigerate the truck, such as ordinary water ice, "Dry Ice" (solidified carbon dioxide), hold-over plates containing a eutectic which is in turn refrigerated by means of a conventional compressor and refrigeration system operated by an electric motor plugged into some convenient source.

In addition there is a so-called "quick disconnect" system utilizing quick connection to and disconnection from ammonia lines communicating with the plant refrigeration system. But as in the case of water ice, "Dry Ice" and other "hold-over" arrangements, there is no provision for recovery while the vehicle is on the road.

There is also currently employed a system including a 90-volt alternator driven by the truck engine, to produce alternating current that is in turn passed through a rectifier for conversion to D.C. which then operates a D.C. electric motor driving the compressor to make refrigeration while the engine is running. At night or at any time when the vehicle engine is not running, and refrigeration is desired, the system rectifier is plugged into a proper alternating current source and the D.C. motor is then energized by the rectifier output as before.

The principal object of the invention is to provide an alternatively powered vehicle refrigeration system, simple and economical, which will refrigerate the load while the vehicle engine is idling and the vehicle is at rest or while the engine is running and the vehicle is in motion or while the engine is not running and the vehicle is at rest.

Another object of the invention is to provide a vehicle refrigeration system of the type described characterized by simplicity and self-governing features such that the driver need have no training in or knowledge of its operation, other than to plug in the power line at the plant when the engine is stopped and the vehicle parked for an extended period.

A further object of the invention is to provide a vehicle refrigeration system, alternatively powered by the vehicle engine or an outside source of current, in which high voltage supply is completely excluded from all locations where personnel might be endangered.

Further objects, features and advantages of the invention will become apparent from the following detailed description of a preferred embodiment thereof taken in conjunction with the accompanying drawings in which like numerals refer to like parts in the several views and in which:

Fig. 1 is a side elevation of a motor truck indicating generally the arrangement of the novel system of the invention;

Fig. 2 is a front view of the vehicle shown in Fig. 1 with portions cut away showing the vehicle radiator, the condenser of the refrigerating system of the invention and the electric motor for alternatively driving the system;

Fig. 3 is a block diagram showing electrical connections of the system;

Fig. 4 is a front view of the system itself showing the principal components thereof which are mounted at the front of the engine;

Fig. 5 is a side view with portions broken away and partly in section of the system as shown in Fig. 4;

Figs. 6 and 7 are fragmentary views with portions broken away of the over-running clutch employed in the system of the invention.

The general arrangement of the system is apparent from Fig. 1. The truck is indicated generally by the numeral 10 and comprises a cab 12 and an insulated cargo carrying body 14. The engine is indicated generally by the numeral 16, the truck's generator by the numeral 18, the fan by the numeral 20, the truck radiator by the numeral 22 and the condenser of the refrigerating system by the numeral 24. The electric motor for supplying alternative power is indicated by the numeral 26 and the compressor of the refrigerating system by the numeral 36.

A front view of the same general arrangement is illustrated in Fig. 2.

Referring now more particularly to the detailed drawings of Figs. 4–7, my novel system will be seen to comprise an electric motor 26 which may conveniently be mounted on a bracket 28 attached to a portion 30 of the frame of the vehicle. The motor is mounted directly beneath the crank shaft of the truck engine 16 at the front thereof. The generator 18 and the fan 20 are belt-driven from the engine with the belt drive 32. Attached to the engine and firmly mounted thereon by means of one or more brackets 34 is the compressor 36 which may be of standard type used in automotive refrigerating or air conditioning systems. This compressor may be conveniently belt-driven from the sheave 38 of the generator 18.

As will be more clearly observed in Fig. 5, on the front end of the crank shaft 40 of the engine I mount an over-running clutch 42, the detailed construction of which is shown in Figs. 6 and 7. This clutch is provided with a sheave 43 to receive two driving belts, one the belt 32 which drives the fan 20 and the generator 18, and the other to receive the belt 44 which is driven from the sheave 46 on the shaft 48 of the electric motor 26.

Referring now to Figs. 6 and 7, it will be seen that the shaft 40 is keyed by a key 50 to the inner member 52 of the over-running clutch 42. Thus, when the engine crank shaft 40 is revolved by the engine in a clockwise direction, as seen in Fig. 6, the rollers 54 of the clutch will jam in the slots 56 against the bearing 59 of the outer member 60 of the clutch, thus causing the outer member 60 to become locked to the inner member 52 so that the whole will revolve in a clockwise direction under the influence of the truck engine. This in turn will cause the belts 32 and 44 to be driven in a corresponding direction, the belt 32 transferring the energy to drive the generator 18 and the fan 20 and in turn the compressor 36 through the belt 61. The belt 44 revolves the armature of the motor 26 when the vehicle engine is running at which time the electric motor is not plugged in. No appreciable load is applied to the truck engine under these conditions since no current is passing through any of the windings of the motor 26.

As shown in Fig. 5 the compressor 36 is provided with a magnetic clutch 62 which is controlled by a thermostat (78 in Fig. 3) located in the body 14 of the truck so as to engage and disengage the compressor depending upon the temperature within the truck body.

When the compressor 36 is operating, the compressed refrigerant is carried by one of a pair of tubes 64 to the evaporator 66 in the truck body, the evaporator being provided with blowers 68 energized by the truck electrical system to blow air through the coils and fins of the evaporator 66. Evaporated refrigerant returns to the condenser through one of the tubes 64. The motor for driving the blowers 68 is indicated schematically and is driven by the regular truck electrical system.

Should it be desired to operate the refrigerating system without the use of the truck engine, it is only necessary to plug the system into an appropriate source of electric current, depending upon the characteristics of the motor 26, using the socket 70 provided for the purpose. This will energize the electric motor 26 through the starter 86 and cause the belt 44 to drive the outer member of the over-running clutch 42 in the same direction of rotation as it had been driven by the inner member 52. When the outer member is driven in this direction, the rollers 54 are loosened, and recede out of engagement with the bearing 59 compressing the biasing springs 58, and the inner member 52 remains completely stationary. Thus, no load is placed on the electric motor by the presence of the engine 16. The motor 26, through the series of belts and pulleys, drives the fan 20, the truck generator 18 and the compressor 36 of the refrigerating unit, all in the same direction as previously driven by the engine 16.

Referring to Fig. 3, the arrangement of electrical controls will become apparent. The truck battery is indicated diagrammatically by the block 72 and is connected into the system only when the ignition and accessory switch 74 is closed. Closure of the switch energizes the low and high pressure control 76, the thermostat 78, as well as the blowers 68 of the evaporator unit. In addition, it supplies the necessary current for operating the defrosting switch 80 which in turn controls the solenoid by-pass 82 to admit hot refrigerant fluid directly into the coils of the evaporator 66 in case the latter becomes clogged with frost. Also the truck electrical system provides current to energize the magnetic clutch 62 of the compressor 36. The thermostat 78 located in the cargo space controls the magnetic clutch 62 so that the clutch is inoperative unless current reaches it from the battery 72 through the controls 74 and 76. When for any reason, such as opening the ignition switch 74 or action of the thermostat 78, vehicle current is cut off from the solenoid by-pass 82 the latter operates to balance the pressure on both high and low sides of the system so that starting will always be against minimum load. The truck electrical system also furnishes power for operating the low voltage relay 84 so that the energizing and de-energizing of the electric motor 26 is dependent on the same controls provided for the low voltage part of the system.

For most installations I have found that a 2 H.P., 3 phase, 220 volt, A.C. motor is suitable for operating the refrigerating system under most conditions. The 220 volt 3φ source is plugged into the plug-in socket 70, passes through the low voltage relay 84, if the latter is closed, through the starter 86, to the motor 26. A feature of the invention, therefore, is the complete exclusion from the interior of the truck body or cab of all high voltage supply as an important safety measure.

The novel system in accordance with the invention provides numerous advantages which should be apparent from the foregoing description. The cost is far less than that of any other system of which I am aware as the electricity to operate all the elements of the refrigerating system, with the exception of the electric motor 26, is furnished by the generator 18 of the vehicle itself, which, even at idling engine speed, will supply sufficient power for the entire system without drain on the battery. The current of air required to cool down the refrigerant in the condenser 24 is furnished by the fan already a part of the truck engine (as well as by motion of the vehicle). These items are operated either by the truck engine when the vehicle is in motion or by the motor 26 when the vehicle is at rest.

There is a further advantage in the system according to the invention in that there is a great saving in space as the only fixture mounted inside the truck body itself which might in any way cut down the usable storage space therein is the evaporator with its blower. Of course, the insulated truck body could be suitably formed so that this element would be mounted entirely outside the storage space, using appropriate air ducts leading thereto.

Particularly, it should be noted that when the engine 16 is shut down and the motor 26 is operating, all of the necessary parts of the truck refrigerating system previously operated by the truck engine are now operated by the motor 26. For example, the fan 20 is operating just as it would be if the engine were turning, to pull cooling air through the condenser. Similarly, the generator 18 is operating to recharge the truck battery supplying current for the various controls and the evaporator blowers. The compressor 36, of course, operates whether driven by the engine or by the electric motor. Where the industry practice is followed of connecting a warming unit to the truck engine when parked for the night to facilitate morning starting, the novel system has obvious special advantages since the water pump is also operated by the motor 26. Thus the heat applied to the engine is uniformly distributed, and the whole engine is heated by circulation of the water.

While I have disclosed and described a presently preferred embodiment of the invention, it should nevertheless be understood that the same is susceptible of various modifications and changes by persons skilled in the art and therefore the invention is limited only by the scope of the appended claims.

I claim:

1. In a motor vehicle having an internal combustion engine and a cargo storage space adapted to be refrigerated, said engine having a crank shaft, in combination with said engine and shaft an over-running clutch having its inner member keyed to said shaft, a fan for the engine, a generator for supplying current to the regular vehicle electrical system, a refrigerating compressor, the three last named elements being belt-driven from the outer member of said clutch, an electric motor mounted independently of said engine adapted to be actuated by an outside source of current, the shaft of said motor being connected by a belt to the outer member of said over-running clutch whereby said clutch and the remaining elements belt-driven thereby may be driven alternatively by said electric motor independently of said crank shaft, an evaporator and blower in operative relation to said storage space for cooling the same, said blower being driven by the regular vehicle electrical system and the evaporator being supplied with refrigerant from said compressor, and a condenser in communication with said compressor and evaporator, the same being mounted in the air stream of said engine fan.

2. In a vehicle having an engine and crank shaft, and an electrical system for said engine including a battery and a generator, the combination which comprises a refrigerating unit having a compressor and condenser and an evaporator and blower, said blower being powered by said electrical system for said engine, an electric motor adapted to be energized by an external source of current, an over-running clutch having its inner member connected to said shaft, and a belt drive interconnecting the outer member of said clutch and said motor, generator, and compressor so that the two last named elements may be alternatively driven by either said engine or said motor.

3. In a motor vehicle having an engine and a low voltage operated ignition system for the same, the combination comprising an electric motor adapted to be driven by an external source of current independent of said low voltage, a refrigerating unit for cooling a portion of said vehicle, a drive including an over-running clutch interconnecting said engine, motor and refrigerating unit so that the latter may be alternatively driven by either said engine or said motor, and a system of electrical controls energized only by said low voltage for said refrigerating unit, said controls including in series connection with each other a manual control switch, a thermostat responsive to the temperature in the space to be cooled and a relay controlling the input circuit of said motor.

4. The combination as claimed in claim 1 including a solenoid operated by-pass valve in series with said thermostat arranged when de-energized to interconnect the high and low sides of said refrigerating unit.

5. The combination as claimed in claim 1 including a magnetic clutch between said drive and said refrigerating unit, said clutch disconnecting said drive when de-energized and being actuated by said thermostat.

References Cited in the file of this patent

UNITED STATES PATENTS

| | | |
|---|---|---|
| 2,058,872 | Heideman | Oct. 27, 1936 |
| 2,264,821 | Zukoski | Dec. 2, 1941 |
| 2,614,396 | Ratermann | Oct. 21, 1952 |
| 2,636,356 | Ryan, Jr., et al. | Apr. 28, 1953 |
| 2,699,043 | Kramer | Jan. 11, 1955 |

UNITED STATES PATENT OFFICE
CERTIFICATE OF CORRECTION

Patent No. 2,895,308                      July 21, 1959

Francis Alward

It is hereby certified that error appears in the printed specification of the above numbered patent requiring correction and that the said Letters Patent should read as corrected below.

Column 6, lines 5 and 9, for the claim reference numeral "1", each occurrence, read -- 3 --.

Signed and sealed this 16th day of February 1960.

(SEAL)
Attest:

KARL H. AXLINE
Attesting Officer

ROBERT C. WATSON
Commissioner of Patents